June 6, 1961 — R. D. HAMILTON — 2,987,170
SCREW-TYPE CONVEYOR

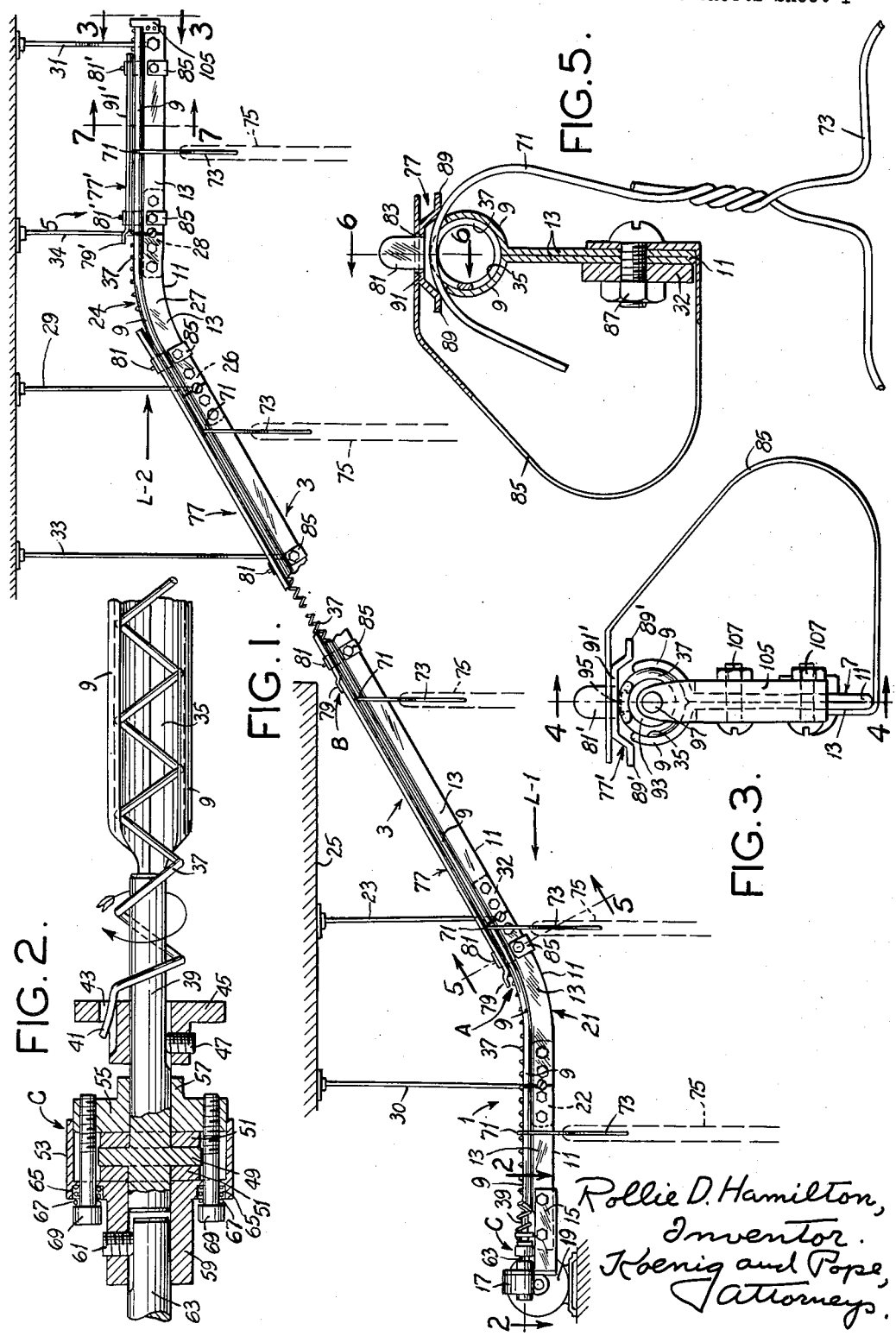

Filed Oct. 3, 1958 — 2 Sheets-Sheet 2

Rollie D. Hamilton,
Inventor.
Koenig and Pope,
Attorneys.

United States Patent Office 2,987,170
Patented June 6, 1961

2,987,170
SCREW-TYPE CONVEYOR
Rollie D. Hamilton, Kissimmee, Fla., assignor to Auto Express Rail, Inc., St. Louis, Mo., a corporation of Missouri
Filed Oct. 3, 1958, Ser. No. 765,172
11 Claims. (Cl. 198—213)

This invention relates to conveyors of the screw type, being an improvement upon the conveyor construction shown in my United States patent application Serial No. 698,745, filed November 25, 1957, for Conveyor, issued as Patent 2,908,379, being particularly but not exclusively useful for transporting clothes hangers.

Among the several objects of the invention may be noted the provision of an improved spring screw type of conveyor of the class described in said patent, adapted to be mounted with sloping reaches, along which supporting hooks may be reliably transported without the possibility of back-slip; the provision of simple means for preventing such back-slip and which may also be employed on horizontal reaches of the conveyor as an improved form of brake adapted in one form to minimize chattering of the spring screw; and the provision of an alternative conveyor form for use in a sloping reach also arranged to prevent back-slip and adapted if desired to drop articles at points other that at the end of the conveyor. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, FIG. 1 is a side elevation illustrating one form of the invention applied to a conveyor incorporating a sloping reach;

FIG. 2 is an enlarged horizontal section taken on line 2—2 of FIG. 1, illustrating an over-load driving slip clutch;

FIG. 3 is an enlarged right-end elevation viewed from line 3—3 of FIG. 1;

FIG. 5 is an enlarged cross section taken on line 5—5 of FIG. 1, illustrating one form of an element employed to prevent back-slip of a typical article on said sloping reach;

Corresponding reference characters indicate corresponding parts throughout the several views of the drawings.

Figure 4:
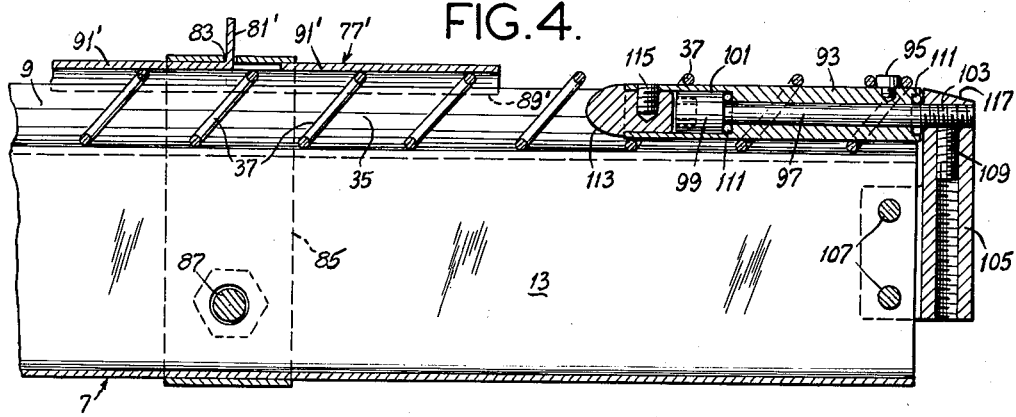
FIG. 4 is a cross section taken on line 4—4 of FIGS. 3 and 7.

Referring now more particularly to FIG. 1, there is shown a conveyor system made according to the present invention adapted for installation between different levels indicated at L–1 and L–2. For example, the levels L–1 and L–2 may be those corresponding to different floors in a building. For purposes of illustration, the conveyor has a lower reach 1 at level L–1, a sloping reach 3 and an upper reach 5 at level L–2.

As shown in cross section (FIG. 5), each reach and connection therebetween, whether level, curved or sloping, is composed of marginal groove-forming or channel-forming portions 9, shaped as at 11 to provide a multiply supporting flange 13. Suitable means are employed for supporting the reach 1 as, for example, by means at one end of a bracket 15 bolted thereto, said bracket forming an extension from a gear-reduction unit 17. The unit 17 forms a part of a motor drive 19. The reaches 1 and 3 are connected by a curved junction piece 21 of the same cross section as reaches 1, 3 and 5, that is, the section has parts 9, 11, 13. Parts 1 and 21 are joined by bolted side plate means 22.

The reach 3 is constituted by similar parts 9, 11, 13. It is connected to piece 21 by side plate means 32. At its upper end, reach 3 is connected with a curved junction piece 24 by side plate means 26. Piece 24 has the same cross section as reach 3, consisting of parts 9, 11, 13. The reach 5 has similar parts 9, 11, 13. Piece 24 and reach 5 are connected by side plate means 28. Conventional goose-neck hangers 23, 29, 30, 31, 33 and 34 support the reaches 1, 3, 5 and the curved junction pieces 21, 24. Further details of the hangers will be unnecessary, since their forms are conventional and they have been described in said patent.

Figure 7:
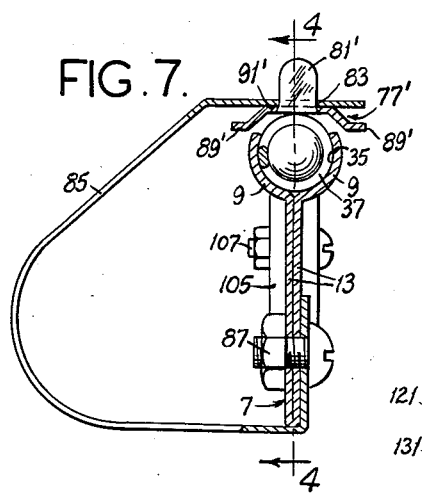
FIG. 7 is an enlarged cross section taken on line 7—7 of FIG. 1, illustrating another form of said element employed as a brake per se.
Figure 6:
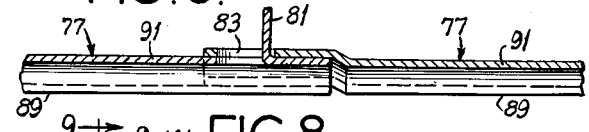
FIG. 6 is a vertical fragmentary detail section taken on line 6—6 of FIG. 5.

In view of the above, it will be seen that there is formed by the groove-forming portions 9 a continuous channel 35, the cross section of which is made to embrace an angle of greater than 180°, as illustrated, for example, in FIGS. 5 and 7, this condition applying to all of the joined reaches 1, 3 and 5. It will be understood that, if desired, lateral curves may be employed in any reach, as will be clear from said patent.

Lying in the channel 35 is a coil spring 37 which, as shown in FIG. 2, is wrapped at its power input end around a stub shaft 39. The tip 41 of the spring is inserted into an opening 43 of a disc 45, held to the stub shaft 39 by a set screw 47. Shaft 39 carries a flange 49 sandwiched between friction plates or washers 51, which may be metallic or nonmetallic such as brake lining. The flange 49 and washers 51 are located in a cup 53, having at its end an axially movable enclosure 55. A hub 57 of the enclosure 55 under overload conditions is rotatable with respect to the stub shaft 39. The cup 53 is provided with a hub 59 which also under said overload conditions is rotatable with respect to the stub shaft 39. However, it is fastened by means of a set screw 61 to an output shaft 63 of said gear-reduction unit 17. Pocket-forming openings 65 in the cup 53 are arranged to accept springs 67 and headed adjustable tensioning bolts 69 threaded into the movable enclosure 55. The bolts 69 are located in the cup 53 outside of the flange 49 and friction washers 51. By adjusting the threaded positions of the bolts, the springs 67 may be compressed so as springingly to draw together the hubs 57 and 59, squeezing the members 49 and 51. This slip clutch arrangement (designated C in general) provides a driving connection between the shafts 63 and 39 under normal load conditions. It also provides for slip, should an overload occur on the stub shaft 39, as might occur if rotation of the spring 37 were to be unduly resisted.

As is apparent from said patent, the purpose of turning the coil spring 37 in the channel 35 is to effect advance along members 9 of hooks 71 of devices such as garment hangers 73. It will be understood that in reaches such as 1 or 5, the curves above-mentioned may be employed as illustrated in said patent, but unnecessary to illustrate herein.

The spring 37 of course passes through the channel portion 35 of the sloping reach 3. Without due precautions being taken, it is possible under some conditions that a hook 71 might slip back over successive coils of the spring 37 in moving up a sloping reach such as 3, particularly on steep slopes. In order to prevent this, a series of cap-forming inverted channels 77 are employed having flared ends 79 for freely accepting the tops of the hooks 71, as illustrated at A in FIG. 1. The flared ends 79 also overlap with the opposite ends of the respective channels 77, as illustrated at B in FIG. 1. Each channel 77 has conveniently located one or more struck-up tongues 81 for cooperation with slots 83 in generally U-shaped spring members 85 bolted to the supporting flange 13, as shown at 87. Marginal edges of the channels 77 are shown at 89 (FIG. 5). Normally the channels are pressed downward for engagement with the upper edges of the groove-forming portions 9. This is the condition when no hook 71 is under a channel 77. On the other hand, when a hook enters the respective channel, the latter is lifted and functions as a hold-down and anti-back-slip means for the hook 71. This also causes some slipping brake action on the spring, so as to cause some wind-up in it under normal driving conditions. If any portion of the spring becomes positively locked against rotation as by improperly reversely applying a hook 71 so as, for example, to interfere in its progress with one of the springs 85, then the clutch C will slip.

It will be understood that, in the case of the channels 77, the flanges 89 are preferably designed to rest upon the margins of the groove-forming portions 9, the flat portion 91 being clear of the spring when no hook is present. Under such conditions the channel will not act as a brake. However, if desired a channel such as 77 may also be used as continuously operative brakes by modifying the flanges 89, as will appear. While holding channels such as 77 are not necessary on horizontal reaches such as 1 and 5, such a channel, with the stated modification, is useful as a constantly slipping brake at the extreme end portion of the spring 37, in order to keep it partially wound when it is being driven so as to minimize irregular action and chatter.

At the upper right of FIG. 1 is illustrated the use of one of the modified channels 77' as a brake per se located near the end of a spring 37 (see also FIGS. 3, 4 and 7). Thus this channel 77' also has the flat portion 91' and flanges 89', with struck-up tongues 81'. Spring clamps 85 are again employed, having the slots 83 for cooperation with the tongues 81', being bolted to the flange 13 as shown at 87. In this case the spring members 85 force the flat portion 91' of the channel 77' against the top of the spring 37, the flanges 89' being dimensioned to remain clear of the margins of members 9. Thus the member 77' acts continuously as a slipping brake at a location toward the end of the spring. At the same time, a hook 71 may be accepted under the channel for movement to the end of the spring.

As illustrated at B in FIG. 1, when a hook 71 leaves the rear end of one channel 77 it passes under the next, since the unflanged rear end of one channel fits under the flanged forward end of the next succeeding channel. As many channels may be used on a sloping reach 3 as may be necessary to encompass the entire reach. Also, one or more channels 77' may be employed as braking means near or toward the end of spring 37.

Referring to FIG. 4, the end of the spring 37 is wrapped around an arbor 93 and anchored thereto by means of pin 95. The arbor is freely rotary on a pin 97, which has a head 99 arranged in a socket 101 of the arbor. This pin is threaded at 103 to a bracket 105, bolted to the end of the last flange 13, as shown by fasteners 107. A set screw 109 holds the pin 97 in place. Antifriction thrust bearings 111 are employed for the arbor 93. A streamlined bullet-shaped plug 113 is held by a set screw 115 in the end of the opening 101. A sloping portion 117 on the bracket 105 permits hooks that are driven from the end of the spring to drop off if they have not already been removed by manual or other means.

Figure 8:
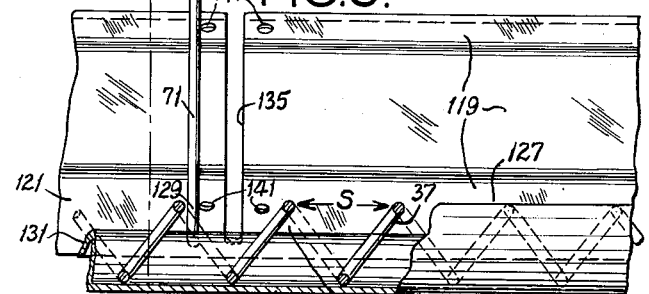
FIG. 8 is a fragmentary plan view of an alternative form of an anti-back-slip device, parts being broken away.
Figure 9:
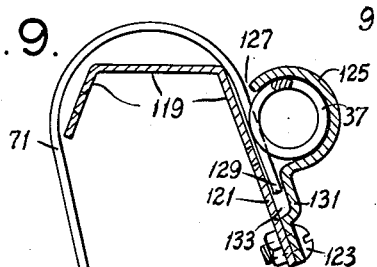
FIG. 9 is a cross section taken on line 9—9 of FIG. 8.
Figure 10:
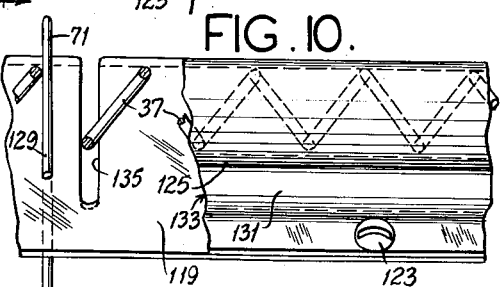
FIG. 10 is a right-side elevation of FIG. 9, parts being broken away.

An alternative form of spring-containing and hook-receiving channel is illustrated in FIGS. 8, 9 and 10. This form does not require hold-down channels such as 77 on sloping reaches to prevent back-sliding of hooks. It consists of an inverted U-shaped hook-supporting channel portion 119 (FIG. 9) with one long side cover plate means 121 to which a spring guide channel 125 is attached by bolts 123. The hook-support 119 is seen in FIG. 9 to include, in addition to the downward extending cover plate means 121 on the right side of the hook-support, a horizontal transverse extension from the cover plate means (intermediate portion of the hook-support) for supporting hooks, and a downward extending lip (left side of the hook-support). Channel 125 consists of a partial tube subtending an angle in section of somewhat more than 180°, so as to leave a narrow upper entry slot 127 adapted just to admit an end 129 of a hook 71 straddling the U-shaped portion 119. A pocket shape 131 terminates the tube channel, thus providing a longitudinal lower exit slot 133 for receiving the inserted end 129 of each hook 71. The slots 127 and 133 are, as shown in FIG. 9, in a sloping plane. The result is that the hook cannot back-slide on a slope, being trapped in the space S between spring loops. The narrowness of the slot 127 ensures that the hook end 129 will enter one of the spaces S between loops of the spring 37, rather than one of the triangular spaces such as T. In such a position the hook 71 may drop from the spring 37 through an appropriate slot 135 formed anywhere in the inverted channel 119; whereas if the end 129 were allowed to get into the space T, it could not drop through such a slot because it would be interlinked with the spring 37. In other words, this arrangement prevents interlinking of the hooks 71 with the spring loops, so that at an appropriate location the hook may be dropped away from the channel. Such drop may be provided for by a slot such as 135 in the channel 119. If a slot such as 135 is used, then the remainder of the channel parts beyond the slot may be useful for applying additional hooks beyond the slot for independent subsequent transfer.

Figure 11:
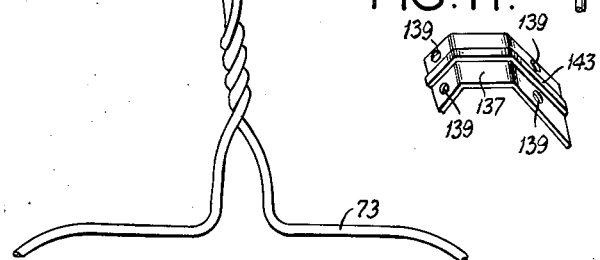
FIG. 11 is an isometric view of a slot-closing part useful in connection with the alternative form shown in FIGS. 8–10, but shown on reduced scale.

The slot may be closed by inserting under the channel 119 a quick-detachable piece such as shown in FIG. 11, which consists of a short insert 137 of channel shape, having holes 139 for accepting screws (not shown) adapted to be threaded into threaded openings 141 on each side of the slot 135 (FIG. 8). Thus the channel shape 137 may be attached under the channel 119 to form a bridge across the slot 135. The insert is provided with a raised rib 143 for infilling the slot to provide for smooth travel of a hook 71 thereover. When desired, the insert 137 may be removed to expose the slot 135 for dropping out of hooks. While the slot 135 weakens the channel 119, it will be understood that support may be effected by hangers such as 23, 31 or 33 attached as required on adjacent sides of the slot.

It will be understood that the brake action contemplated above is not sufficient to provide a load which will cause slippage at the clutch C. Such slippage occurs only upon overloads like those due to positive interference between an article being transported and some stationary part.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:
1. A conveyor comprising a rotatable coil spring having substantial spaces between its coiled loops, a guide channel peripherally embracing said spring to a substantial extent but leaving an opening across which the coils extend, a hook support extending along said guide channel in spaced relation to one margin of said opening adapted to form a guide slot for the introduction of a hook end in a direction across said opening and between the loops of the coil spring without interlinking the hook end with any spring loop.

2. A conveyor comprising a rotatable coil spring having substantial spaces between its coiled loops, a guide channel peripherally embracing said spring to a substantial extent but leaving a side opening across which the coils extend, said opening having upper and lower margins, a hook support extending along and in spaced relation to the upper margin of said guide channel to form an entry along said upper margin for downward insertion of hook ends across said opening and between the loops of the coil spring.

3. A conveyor according to claim 2, including means providing another slot along the lower margin of said opening adapted to receive and further guide the downwardly inserted ends of hooks.

4. A conveyor according to claim 3, wherein said hook support includes cover plate means extending downward and in spaced covering relation to said side opening.

5. A conveyor according to claim 4, wherein said hook support also includes a transverse extension from said cover plate means adapted for location under and support of hooks.

6. A conveyor according to claim 5, wherein said cover plate means and transverse extension include an opening through which said hook may drop gravitationally.

7. A conveyor according to claim 6, including a removable cover for said last-mentioned opening.

8. A conveyor comprising a rotatable coil spring having substantial spaces between its coiled loops, a guide channel peripherally embracing said spring to a substantial extent but leaving a sidewise opening across which the coils extend, an inverted hook-supporting channel a side of which extends downward across said opening and is spaced from the upper margin of said opening to form an entry slot for downward reception of hook ends between loops of the coil spring when the hooks rest on the supporting channel.

9. A conveyor comprising a rotatable coil spring having substantial spaces between its coiled loops, a guide channel peripherally embracing said spring to a substantial extent but leaving a sidewise opening across which the coils extend, said opening having upper and lower margins located in a sloping plane, an inverted hook-supporting channel a side of which slopes across said opening and is spaced from its upper and lower margins to form an upper entry slot for downward insertion of hook ends between loops of the coil spring, said lower margin being arranged with respect to said sloping side to form a lower slot for reception of said hook ends after passing between said loops.

10. A conveyor according to claim 9, including at least one transverse opening extending across the hook-supporting channel to said lower slot, whereby hooks may drop freely from the channel and spring.

11. A conveyor according to claim 10, including quick-detachable means adapted to cover said transverse opening in the channel.

References Cited in the file of this patent

UNITED STATES PATENTS

| | | |
|---|---|---|
| 1,131,558 | Schnell | Mar. 9, 1915 |
| 1,320,292 | Taliaferro | Oct. 28, 1919 |
| 1,741,981 | Dewey et al. | Dec. 31, 1929 |
| 1,750,310 | Jonkel et al. | Mar. 11, 1930 |
| 1,984,659 | Simmons et al. | Dec. 18, 1934 |
| 2,487,693 | Canon | Nov. 8, 1949 |
| 2,620,917 | Dahlberg | Dec. 9, 1952 |